United States Patent [19]
Kondo

[11] Patent Number: 6,076,315
[45] Date of Patent: Jun. 20, 2000

[54] FLOOR-WIRING STRUCTURE AND FLOOR MEMBERS FOR STORING CABLE IN SUCH STRUCTURE

[75] Inventor: Naohiro Kondo, Yokkaichi, Japan

[73] Assignee: Sumitomo Wiring Systems, Ltd, Yokkaichi, Japan

[21] Appl. No.: 08/921,058

[22] Filed: Aug. 29, 1997

[30] Foreign Application Priority Data

Aug. 30, 1996 [JP] Japan .................................. 8-230569

[51] Int. Cl.⁷ .................................................. E04C 2/52
[52] U.S. Cl. ...................... 52/220.1; 52/220.3; 52/220.5; 52/220.7
[58] Field of Search ............... 52/220.1, 220.5, 52/220.3, 220.7; 24/306, 442

[56] References Cited

U.S. PATENT DOCUMENTS

| | | | |
|---|---|---|---|
| 2,950,575 | 8/1960 | Hellwig | 174/48 |
| 3,400,247 | 9/1968 | Deacon | 329/435 |
| 4,773,196 | 9/1988 | Yoshida et al. | 52/126.5 X |
| 4,850,163 | 7/1989 | Kobayashi et al. | |
| 4,996,810 | 3/1991 | Forde | 52/221 |
| 5,263,289 | 11/1993 | Boyd . | |
| 5,483,776 | 1/1996 | Poppe . | |
| 5,732,445 | 3/1998 | Stodolka et al. | 24/16 |

FOREIGN PATENT DOCUMENTS 8130821  5/1996  Japan .

*Primary Examiner*—Carl D. Friedman
*Assistant Examiner*—Brian E. Glessner
*Attorney, Agent, or Firm*—Greenblum & Bernstein, P.L.C.

[57] ABSTRACT

In the floor-wiring structure for wiring a cable, a space is secured for storing a surplus part of the cable. Cable-cutting work and end portion conditioning on the working site are thus dispensed with and the surplus part of the cable is easily stored. The structure comprises unitary floor members having a pathway channel. Some of the unitary floor members are replaced by a floor member for storing part of the cable. The latter floor member comprises an upwardly opened space for storing part of the cable, entrance-and-exit ports thereto or therefrom, a guide provided in the space for storing cable for maintaining the cable in a looped state and a cable-fixing band provided in the same space for fixing the cable in a freely removable way.

13 Claims, 5 Drawing Sheets

6,076,315

FLOOR-WIRING STRUCTURE AND FLOOR MEMBERS FOR STORING CABLE IN SUCH STRUCTURE

BACKGROUND OF THE INVENTION

1. Field of the Invention

The present invention relates to a floor-wiring structure applied to the floor parts in a construction or building and to a member for floor wiring used in this structure.

2. Description of Related Art

Recently, in order to rationalize office organization, office innovation has become a very current issue. It includes, for example, replacement or installation of office automation (OA) apparatus, lay-out modification due to office reorganization, etc. In accordance with this tendency, an increasing number of wiring systems have been developed. A prevailing system is a floor-wiring structure.

As a floor-wiring structure, there already exists a double-floor structure in which unitary floor members are tiled or arranged side-by-side and head-to-tail (in a checkered pattern) on a base floor. This type of structure is disclosed, for example, in Japanese Patent Application published before examination under the No. 8-130821.

Usually, after installing those unitary floor members in a checkered pattern on a base floor, thereby forming wiring pathways, cables are installed therein. In such a structure, there is no zone for storing part of a cable where part of the cable still to be used is stored and held. Hence, it becomes necessary to carry out the work on the site, such as cutting an unused part of the cable, conditioning the cable end, etc. Accordingly, a considerable amount of time is needed for these operations and for controlling the quality of the work thereafter. Special expertise is also needed for accomplishing these operations. Such difficulties tend to lower the quality of the cable-end conditioning on the working site. Further, in the above operation, the cable is cut after being wired, so that there may not be enough margin of unused cable remaining. It is therefore difficult to respond to a sudden design change required by the working on the site.

In some cases, in order to have a surplus part of the cable available, the floor structure is provided with a storage panel, the bottom side of which has a space for storing part of a cable. In this structure, the surplus part of the cable is looped and put on the base floor. Then, it is covered with the storage panel. Therefore, the cable cannot be further wired, once the storage panel and the floor members are installed. Further, when the wiring of the cable has to be modified, the storage panel must be removed beforehand. These situations worsen the workability of such cables and such systems. Moreover, the positioning of the storage panel and the neighboring floor members is difficult to define with precision.

SUMMARY OF THE INVENTION

It is therefore an object of the present invention to provide a floor-wiring structure in which a cable or other wiring materials are wired. In this floor structure, there are also spaces for storing a surplus part of the wiring material. Work on the site, such as cutting wiring material or conditioning the cable end, is shortened or dispensed with by using the floor-wiring structure according to the present invention. Further, the work involved in storing and/or holding the cable surplus can be significantly simplified and shortened. Moreover, the floor-wiring structure and the floor member make it possible to respond very easily to design changes.

The foregoing and other advantages of the invention are achieved by providing a floor wiring structure for routing wiring material and storing wiring material having a surplus cable portion, wherein the floor wiring structure comprises:

a base member;

a plurality of first unitary floor members having a pathway channel and being constructed and arranged on the base member in a generally checkered pattern so as to form at least one wiring pathway to receive the wiring material;

a second floor member for storing a portion of at least one cable, the second floor member replacing at least one of the unitary floor members and comprising an upwardly-opening space for storing the surplus cable portion of at least one cable, and comprising at least one cable entrance and at least one cable exit, and a fixing system. The floor wiring structure is constructed and arranged so that, when the wiring material is provided in the wiring pathways, the surplus cable part may be led into and looped within the space for storing the surplus portion of at least one cable, and fixed to the floor member by the fixing system.

In some embodiments, the plurality of first unitary floor members are preferably constructed and arranged in a generally checkered pattern so as to form at least two intersecting wiring pathways to be occupied by the wiring material.

In some embodiments, the first unitary floor member and the second floor member for storing a portion of at least one cable have the same general shape and dimension as each other.

The floor member may comprise a space for storing the surplus portion of at least one cable, the space being defined by a bottom part, four side walls, and comprising a cable entrance and a cable exit in the side walls. A guide is positioned in the space and being constructed and arranged for maintaining the wiring material in a looped state, and a fixing system provided in the space for fixing the wiring material in a freely removable way. A plurality of guides, such as four guides, can be employed in some embodiments.

In some embodiments, the guide is formed in a cylindrical shape and projects from the bottom part of the space, whereby wiring material is wound and kept therearound.

In some embodiments, the fixing system comprises a tape having two end portions, each of the end portions being provided with a corresponding securing portion.

The end portions may be provided with a corresponding adhesive portion, or a corresponding hook-and-loop fastening portion.

In some embodiments, the fixing system can comprise a clamping element or a plurality of stopper-pins projecting from the bottom part of the space and arranged in a predetermined pattern. According to this type of fixing system, wiring material is pressed against the stopper pins and looped in a zigzag pattern. The wiring material is thereby fixed and stopped, and is secured against a pulling force.

According to this type of floor, unitary floor members and floor members for storing cable are first put on a base floor. Wiring material is wired inside wiring paths formed by channels. The surplus part of the wiring material is stored in a looped position and fixed. In this case, because the space of the floor members for cable-part storing is opened on its upper side, operations like storing the surplus part of the wiring material, fixing it or the like, are easy to carry out.

Thus, since the surplus of the wiring material is stored in the floor members for storing cable and maintained therein, cutting cables and forming the cable end or the like, are operation which are shortened. It becomes easy to respond to design changes.

BRIEF DESCRIPTION OF THE DRAWINGS

The above and the other features and advantages of the present invention will be made apparent from the following description of the preferred embodiments, given as non-limiting examples, with reference to the accompanying drawings, in which.

BRIEF DESCRIPTION OF PREFERRED EMBODIMENTS OF THE INVENTION

Figure 1:
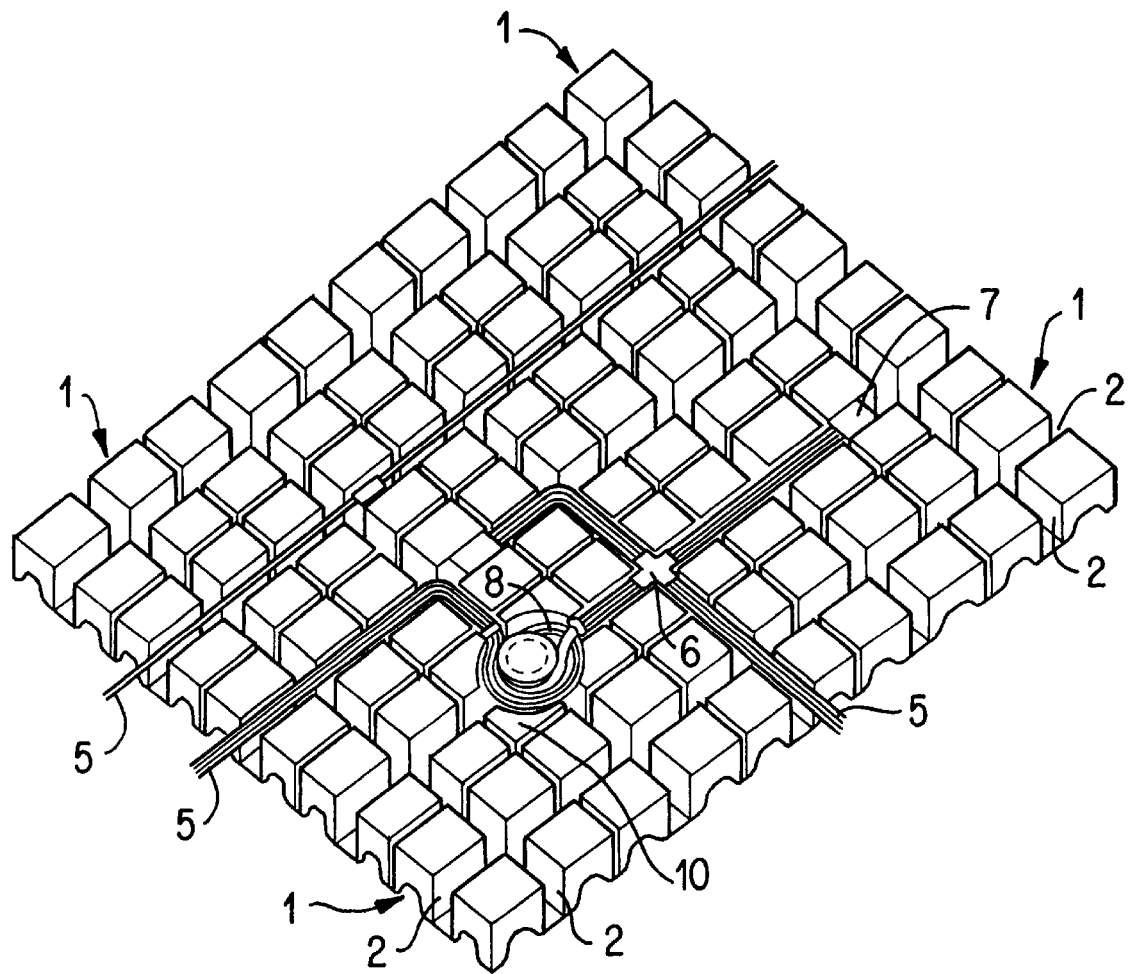
FIG. 1 schematically shows a perspective view of a first embodiment of the whole floor-wiring structure according to the present invention.

In FIG. 1, reference 1 indicates a unitary floor member. A plurality of unitary floor members are tiled or arranged preferably in a checkered pattern on the surface of a base floor to form a two-level floor structure.

Figure 2:
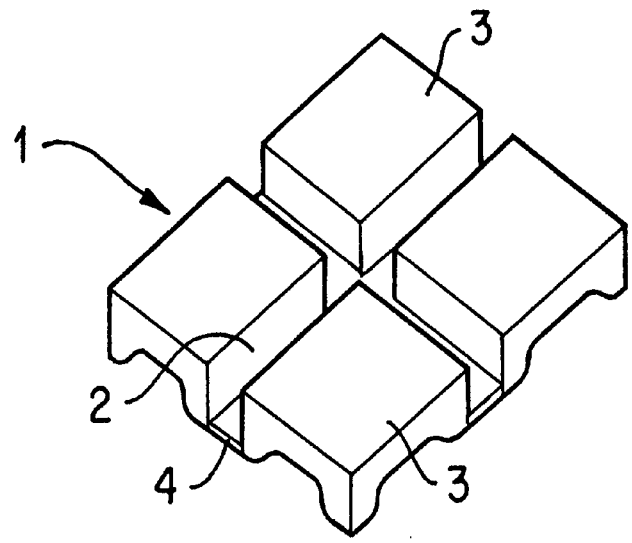
FIG. 2 shows a perspective view of a unitary floor member.

The above-mentioned unitary floor member 1 has a channel portion 2 which forms a path. In the above embodiment, as also shown in FIG. 2, there are integrally provided a plurality, preferably, four blocks 3 and a channel bottom portion 4. The side walls of the four blocks 3 face one another over channel portion 2. The channel bottom portion 4 constitutes the bottom of the channel portions defined by each pair of blocks 3. This configuration forms a unitary floor member 1 having a crossing channel portion 2. When a number of unitary floor members 1 are arranged in a checkered pattern, path-forming channel portions 2 of each unitary floor member 1 are connected linearly and perpendicularly thereto, for example in a grid-like pattern, thereby forming crosswise wiring pathways. In these wiring pathways, there is provided a wiring material such as cable 5, or a wiring apparatus such as a plug socket 6 for zone information (an electrical outlet for branching for a large zone unit), an inner plug socket 7 (an electrical outlet for terminals), etc.

A floor structure for wiring cable thus prepared has thus adopted a "wiring-through-channel" and a "laid-down cable" system. In accordance with preferred embodiments of the invention, some parts of the floor structure, the unitary floor member 1 is replaced by a floor member 10 for storing cable, having the same overall shape and dimension as the floor member 1.

As shown in FIGS. 1 and 2, and as is described in more detail below, floor member 10 is constructed and arranged to accommodate a surplus or excess cable part or portion 8 of the cable or wiring being worked.

Figure 3:
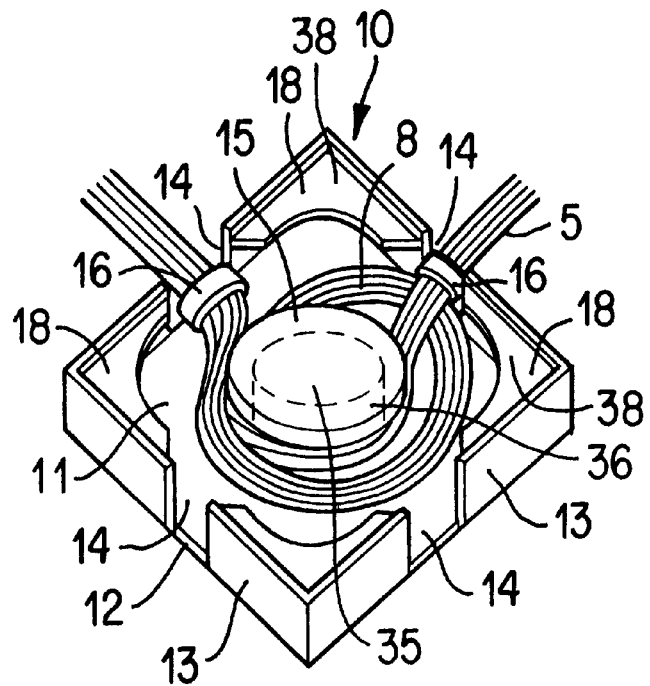
FIG. 3 shows a perspective view of a floor member for cable-part storing.
Figure 4:
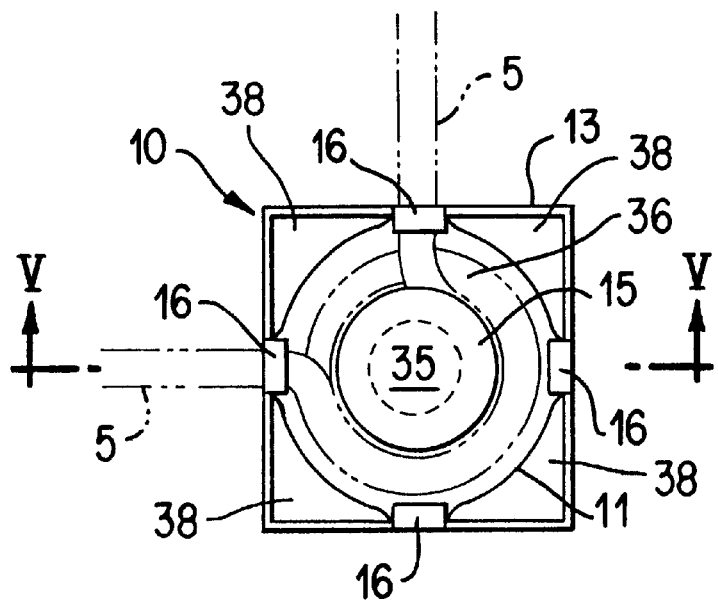
FIG. 4 shows a plan view of the floor member for cable-part storing.
Figure 5:
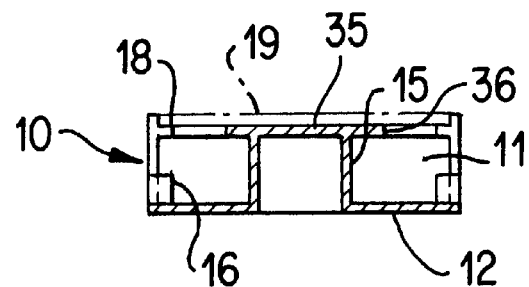
FIG. 5 shows a cross section of the floor member for cable-part storing taken along line V—V of FIG. 4.

As shown in FIGS. 3–5, each floor member 10 has an upwardly open space 11. This space 11 is defined between a bottom part 12 and the inner side of four side walls 13. The middle part of each side-wall 13 is cut-away, so that cable entrance-and-exit ports 14 are formed.

Figure 6:
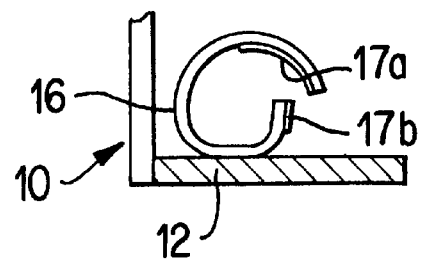
FIG. 6 shows a cross section of a first embodiment of fixing system.

Approximately in the central part of the above-mentioned space 11 for storing part of a cable, there is preferably provided a guide 15 for maintaining the cable 5 in a looped position. This guide preferably has a cylindrical shape and rises from the bottom part 12 of the floor member 10 for storing cable. Other than cylindrical shapes can be employed as well. Near the cable entrance-and-exit ports 14, in the space for storing cable 11, there are provided fixing elements for fixing cable 5. These fixing elements comprise, for example, a cable-fixing tape or band 16 as shown in FIG. 6. This cable-fixing tape 16 is fixed on the bottom part 12 by a screw or the like (not shown). Both end portions of the tape 16 are provided with removable retaining portions 17a, 17b, such as MAGIC TAPE, or other suitable hook-and-loop system, such as VELCRO.

Further, the upper end of the four side walls of the floor member 10 for storing cable are provided with a cover guide 18. This cover guide is adapted to receive a transparent cover 19, for covering the space for storing cable 11, in a freely movable way. As shown in FIGS. 3, 4 and 5, guide 15 is provided with an upper surface 35, and cover guide 18 is provided with an upper surface 38. Upper surface 35 of guide 15 and upper surface 38 of cover guide 18 are substantially the same distance from bottom portion 12.

A method of installing such a floor-wiring structure is described hereinafter.

The base floor (also referred to herein as a base member or base floor member) may be a known floor. A number of unitary floor members 1 are arranged in a checkered pattern thereon with an interposed cushion sheet or the like. In some positions, floor members 10 for storing cable are also arranged. Accordingly, the path-forming channel portions 2 of the unitary floor members 1 form wiring pathways. When a floor member 10 for storing cable 20 is positioned as shown, the cable entrance-and-exit port 14, provided at each side-wall 13 thereof, is aligned with the position of a wiring pathway.

In such a structure, cable 5, plug sockets 6, 7 can be installed in the above-mentioned wiring pathway with a desired lay-out. At the same time, part of the cable 5 is arranged in the floor member 10 for storing cable. Thus, the surplus part of the cable 5 is looped and contained in the space for storing cable 11.

Such a floor structure uses unitary floor members 1 having a channel portion 2 for forming a passage. It is therefore called a "wiring-through channel system". In this system, cable 5 and wiring devices such as plug sockets 6, 7 can be laid down from above. Further, as the space 11 of the floor member 10 for storing cable is upwardly open, the looping and installing of the surplus part of the cable 5 can be easily done from above. Further, the above-mentioned floor member 10 for storing cable is provided with a guide 15 and a cable-fixing tape 16. The surplus part of the cable 5 is bent by winding it around the guide 15. The cable 5 is then fixed by the cable-fixing band 16 near the cable entrance-and-exit port 14, so that the surplus cable can easily be contained in the floor member 10 for storing cable in a predetermined looped state.

As mentioned above, the floor-wiring structure contains a cable-storing zone by virtue of a floor member 10 for storing cable. Then, the cable 5 can be prepared beforehand in a factory with a sufficient margin of extra or surplus length and its end portions subsequently conditioned. As to a workload on the site, it is merely necessary to arrange the cable 5 in a desired lay-out and contain the surplus cable in the floor member for storing cable. Accordingly, cutting off the end portions is dispensed with, leading to greatly simplified line work and shortened working time. Moreover, the quality of end portion conditioning or treatment is not compromised or worsened.

When design modification is needed, the required length of the cable may vary with the modified wiring schedule. Even then, this modification can be compensated for or accommodated by the cable surplus contained in the floor member 10 for storing cable, so that the design modification is easily handled. When wiring is modified, cable can be easily retrieved from the floor member 10 for storing cable.

Thus, the aforementioned unitary floor members 1 and floor members 10 for storing cable are aligned and the wiring devices such as plug sockets 6, 7 are arranged. Then, a cover (not shown in the figures) is put on the upper end of the above-mentioned channel portion 2. Likewise, a transparent cover 19 is put on the upper end of the floor member 10 for storing cable. Further, the whole region where the floor members 1, 10 are aligned, is covered with a finishing material such as a tile carpet, an additional layer of flooring.

Figure 11:
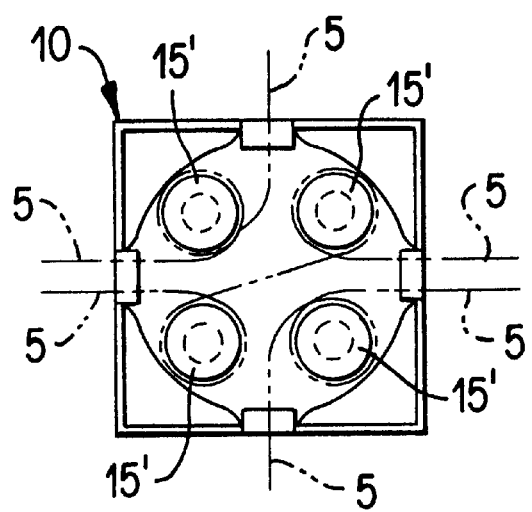
FIG. 11 shows a plan view of another embodiment of the floor member for cable-part storing.

The structure of the floor member for storing cables 10 is not restricted to the abovementioned embodiments and may be subject to various modifications. For instance, as shown in FIG. 11, a guide 15' can be installed at several positions (four positions in the example shown in FIG. 11) inside the space for storing cable 11. Due to this configuration, a plurality of cables 5 passing through, occupying or traversing different wiring pathways can be led to the floor member 10 for storing cable. The surplus part of each cable 5 is then wound around an appropriate guide 15'.

Figure 7:
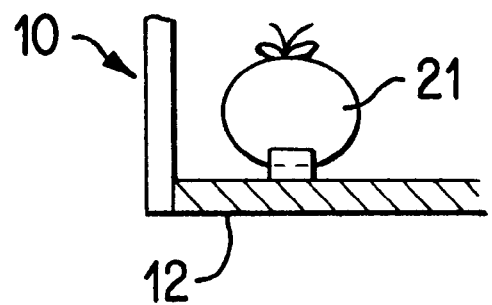
FIG. 7 shows a cross section of a second embodiment of fixing system.
Figure 8:
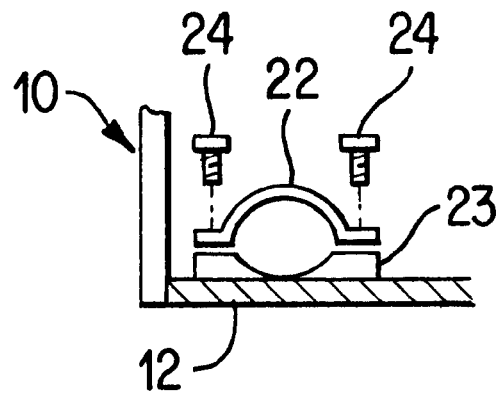
FIG. 8 shows a cross section of a third embodiment of fixing system.
Figure 9:
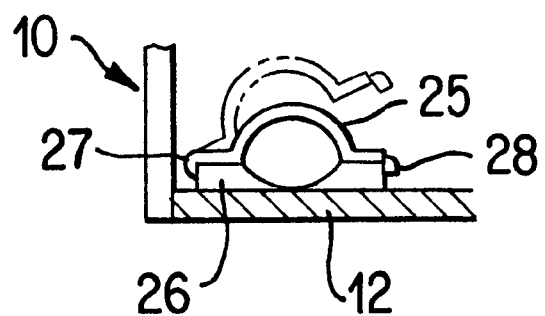
FIG. 9 shows a cross section of a fourth embodiment of fixing system.

To fix the cable 5, several alternative fixing systems, other than the tape 16 shown in FIG. 6, can be envisaged. For instance, as shown in FIG. 7, a ribbon 21 may be fixed on the bottom portion 12 of the floor member 10 for storing cable, thereby binding the cable 5. Alternatively, as shown in FIGS. 8 and 9, the cable may be fixed by a metal clamp 22, 25. In FIG. 8, the metal clamp 22 is fixed to a receiving unit 23 installed on the bottom portion 12 of the floor member 10 for storing cable through a bolt. In the metal clamp 25, shown in FIG. 9, a receiving unit 26 is provided on the bottom portion 12 of the floor member 10 for storing cable. One end portion of the clamp is fixed thereto through a hinge portion 27 in a freely swivelable way, while the other end portion is fixed thereto through a locking system 28.

Figure 10A:
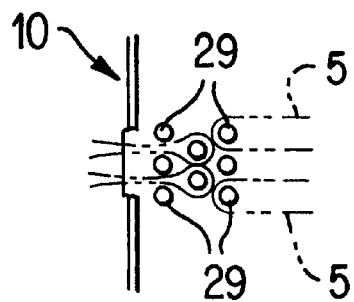
FIGS. 10a and 10b show, respectively, a plan view and a cross sectional view of a fifth embodiment of fixing system.
Figure 10B:
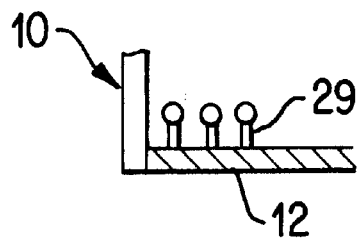

Further still, as shown in FIGS. 10a and 10b, the fixing system may be a plurality of stopper pins 29 set up on the bottom portion 12 of the floor member 10 for storing cable. When such fixing elements are used, the cable 5 is pushed on the stopper pins 29 and wound therearound in a zigzag pattern. This fixing element secures the cable 5 against a pulling force.

The present disclosure relates to subject matter contained in Japanese patent application No. 8-230569 (filed on Aug. 30, 1996) which is hereby incorporated by reference as though set forth in full herein.

Although the invention has been described with reference to particular systems, materials and embodiments, it is to be understood that the invention is not limited to the particulars disclosed and extends to all equivalents within the scope of the claims.

What is claimed is:

1. A floor wiring structure for routing wiring material and storing wiring material having a surplus cable portion, said floor wiring structure comprising:

a base member;

a plurality of first unitary floor members having a pathway channel and being constructed and arranged on said base member in a generally checkered pattern so as to form at least one wiring pathway to receive said wiring material;

a second floor member for storing a portion of said at least one cable, said second floor member replacing at least one of said unitary floor members and comprising an upwardly-opening space defined by a bottom part and four side walls for storing said surplus portion of said at least one cable, said space comprising at least one guide formed in a cylindrical shape and projecting from said bottom part of said space and being constructed and arranged so that said wiring material may be wound and kept therearound, said space comprising a cover guide, and said space comprising at least one cable entrance and at least one cable exit; and a fixing system;

said guide having an upper surface and having a radially extending flange and said cover guide having an upper surface, constructed and arranged to support a cover;

said floor wiring structure being constructed and arranged so that, when said wiring material is provided in said wiring pathways, said surplus cable part may be led into and looped around said guide within said space for storing said surplus cable portion of said at least one cable, and fixed to said floor member by said fixing system.

2. A floor wiring structure according to claim 1, wherein said plurality of first unitary floor members are constructed and arranged in a generally checkered pattern so as to form at least two intersecting wiring pathways to be occupied by said wiring material.

3. A floor-wiring structure according to claim 1, wherein said first unitary floor member and said second floor member for storing a portion of said at least one cable have the same general shape and dimension.

4. A floor member for use in the floor-wiring structure according to claim 1, wherein said space for storing said surplus portion of said at least one cable comprises a cable entrance and a cable exit in said side walls and a fixing system provided in said space for fixing said wiring material in a freely removable way.

5. A floor member according to claimed 4, wherein said fixing system comprises a tape having two end portions, each of said end portions being provided with a corresponding securing portion.

6. A floor member according to claim 5, wherein each of said end portions is provided with a corresponding adhesive portion.

7. A floor member according to claim 5, wherein each of said end portions is provided with a corresponding hook-and-loop fastening portion.

8. A floor member according to claim 4, wherein said fixing system comprises a clamping element.

9. A floor member according to claim 4, wherein said fixing system comprises a plurality of stopper-pins projecting from said bottom part of said space and arranged in a predetermined pattern.

10. A floor member according to claim 4, comprising a plurality of guides.

11. A floor member according to claim 10, comprising four guides.

12. A floor wiring structure for routing wiring material and storing wiring material having a surplus cable portion, said floor wiring structure comprising:

a base member;

a plurality of first unitary floor members having a pathway channel and being constructed and arranged on said base member in a generally checkered pattern so as to form at least one wiring pathway to receive said wiring material;

a second floor member for storing a portion of said at least one cable, said second floor member replacing at least one of said unitary floor members and comprising an upwardly-opening space defined by a bottom part and four side walls for storing said surplus portion of said at least one cable, said space comprising at least one guide formed in a cylindrical shape and projecting from said bottom part of said space and being constructed and arranged so that said wiring material may be wound and kept therearound, said space comprising a cover guide, and said space comprising at least one cable entrance and at least one cable exit; and a fixing system;

said guide having an upper surface and having a radially extending flange and said cover guide having an upper surface, constructed and arranged to support a cover, each of said upper surface of said guide having a cylindrical shape and said upper surface of said cover guide being substantially the same distance from said bottom portion of said space and;

said floor wiring structure being constructed and arranged so that, when said wiring material is provided in said wiring pathways, said surplus cable part may be led into and looped around said glide within said space for storing said surplus cable portion of said at least one cable, and fixed to said floor member by said fixing system.

13. In combination, a floor wiring system of claim 12 and a transparent cover, supported by said upper surface of said guide having a cylindrical shape and said upper surface of said cover guide.

* * * * *

UNITED STATES PATENT AND TRADEMARK OFFICE
CERTIFICATE OF CORRECTION

PATENT NO.   : 6,076,315
DATED        : June 20, 2000
INVENTOR(S)  : N. KONDO

It is certified that error appears in the above-identified patent and that said Letters Patent is hereby corrected as shown below:

At column 8, line 14 (claim 12, line 33) of the printed patent, "glide" should be ---guide---.

Signed and Sealed this

First Day of May, 2001

Attest:

NICHOLAS P. GODICI

Attesting Officer

Acting Director of the United States Patent and Trademark Office